United States Patent [19]

Markham et al.

[11] Patent Number: 5,239,488
[45] Date of Patent: Aug. 24, 1993

[54] APPARATUS AND METHOD FOR DETERMINING HIGH TEMPERATURE SURFACE EMISSIVITY THROUGH REFLECTANCE AND RADIANCE MEASUREMENTS

[75] Inventors: James R. Markham, Middlefield; Philip W. Morrison, Jr., South Windsor; Peter R. Solomon, West Hartford; Philip E. Best, Mansfield Center, all of Conn.

[73] Assignee: On-Line Technologies, Inc., East Harford, Conn.

[21] Appl. No.: 512,422

[22] Filed: Apr. 23, 1990

[51] Int. Cl.$^5$ .............................................. G01N 25/00
[52] U.S. Cl. ...................................... 364/557; 374/9; 374/130; 250/339
[58] Field of Search ............... 364/557; 374/9, 121, 374/126, 130; 250/339

[56] References Cited

U.S. PATENT DOCUMENTS

| | | | |
|---|---|---|---|
| 3,796,099 | 3/1974 | Shimotsuma | 374/9 X |
| 4,465,382 | 8/1984 | Iuchi et al. | 374/9 |
| 4,506,158 | 3/1985 | Cadwallader et al. | 250/338 |
| 4,627,008 | 12/1986 | Rosenthal | 364/550 |
| 4,634,290 | 1/1987 | Rosencwaig et al. | 374/121 X |
| 4,708,493 | 11/1987 | Stein | 374/128 |
| 4,799,788 | 1/1989 | Berthet et al. | 356/45 |
| 4,840,496 | 6/1989 | Elleman et al. | 374/124 |
| 4,841,150 | 6/1989 | Walter | 250/339 |
| 4,845,647 | 7/1989 | Dils et al. | 364/557 |
| 4,890,245 | 12/1989 | Yomoto et al. | 364/557 |
| 4,974,182 | 11/1990 | Tank | 374/9 X |

FOREIGN PATENT DOCUMENTS 0122923 9/1981 Japan ........................................ 374/9

OTHER PUBLICATIONS

Aisenberg, S. "A System for the Measurement of the Absorptivity and Emissivity of a Vehicle During Flight Conditions" *Proceeding of the 5th Annual ISA Test Measurement Symposium Advances in Test Measurement*, N.Y. USA (Oct. 1968) pp. 1-10.

"Normal Emittance Measurements By A Transient, Temperature Technique", by R. J. Tiernan & J. R. Saunders (J. Appl. Physics 64 (2) Jul. 15, 1988.

Primary Examiner—Joseph L. Dixon
Attorney, Agent, or Firm—Ira S. Dorman

[57] ABSTRACT

The apparatus and method permit simultaneous and precise determination of the temperature and spectral emittance, over a wide spectral region, of a hot sample. Radiance, and hemispherical reflectance and transmittance measurements are employed, and FT-IR technology is advantageously applied. Reflectance and (where necessary) transmittance measurements are utilized to determine the fraction of incident radiation, of selected wavelength, that is absorbed by the sample, in turn establishing a spectral emittance value. Taken with the measured radiance at the same wavelength, the spectral emittance value will provide a quantity that can be matched with the spectral radiance of a theoretical black body, again at the selected wavelength, to thereby derive the temperature of the hot sample; this in turn enables determination of the spectral emittance of the sample over a desired spectral range.

25 Claims, 2 Drawing Sheets

APPARATUS AND METHOD FOR DETERMINING HIGH TEMPERATURE SURFACE EMISSIVITY THROUGH REFLECTANCE AND RADIANCE MEASUREMENTS

The United States Government has rights in this invention pursuant to Contract No. F40600-88-C-0011, awarded by the United States Department of Defense (Air Force).

BACKGROUND OF THE INVENTION

There are many circumstances in which it is necessary or desirable to measure the temperature of a hot surface in situ, under conditions in which it is impractical or impossible to provide direct contact by a thermocouple or other form of mechanical probe. For example, such a non-contact technique would beneficially be used to explore and characterize the properties of materials at high elevated temperatures, including in particular the spectral emittance of the material. To achieve utmost accuracy, and consequently the most valuable test data, temperature and emittance must be determined simultaneously, and it is well known in the art that significant difficulties are entailed in achieving that end.

Apparatus and techniques by which temperature measurements can be made remotely, and the significance of emittance considerations thereto, are of course also known in the art. Typical disclosures are found in the following United States patents: Cadwallander et al U.S. Pat. No. 4,506,158, Stein U.S. Pat. No. 4,708,493, Rosenthal U.S. Pat. No. 4,627,008, Berthet et al U.S. Pat. No. 4,799,788, Elleman et al U.S. Pat. No. 4,840,496, Walter U.S. Pat. No. 4,841,150 and Dils et al U.S. Pat. No. 4,845,647. Also of interest in regard to techniques for determining spectral emittance and temperatures by noncontact means, utilizing Fourier-transform infrared (FT-IR) spectroscopy, is the paper entitled "Normal Emittance Measurements By A Transient Temperature Technique," by R. J. Tiernan and J. R. Saunders (J. Appl. Physics 64 (2), Jul. 15, 1988).

Despite the activity in the art indicated by the foregoing, a need remains for a convenient and effective method and apparatus by which the temperature of a hot sample, and its spectral emittance over a desired spectral range at that temperature, can automatically and simultaneously be determined, at high speed and with a high degree of precision. Accordingly, it is the object of the present invention to provide such a method and apparatus.

SUMMARY OF THE INVENTION

It has now been found that certain of the foregoing and related objects of the invention are readily attained by the provision of a method comprising the following steps:

a. irradiating with electromagnetic radiation the test sample heated to a temperature substantially above ambient;

b. determining the fraction "$a_o$" of a selected wavelength of the irradiating radiation that is absorbed by the hot sample, by measuring the fraction "$p_o$" of the selected wavelength radiation that is reflected from it and by measuring the fraction "$t_o$" thereof that is transmitted through it, unless $t_o$ is known to have a value of zero, to thereby determine the spectral emittance "$e_o$" of the sample at the selected wavelength, by application of the equations:

$$a_o = 1 - p_o - t_o;$$

and $$e_o = a_o;$$

c. measuring the radiance "R" of the hot sample at least at the selected wavelength, to obtain at least a value for radiance "$R_o$" at the selected wavelength;

d. correlating the measured value of radiance $R_o$ to the spectral radiance "$B_o(T)$" of a theoretical black body at the selected wavelength, to determine T by application of the relationship:

$$R_o = e_o B_o(T);$$

and e. determining the spectral emittance $e_v$ of the hot sample over the desired spectral range by application of one of the relationships:

(1) $a_v = 1 - p_v - t_v$; and $e_v = a_v$; and (2) $e_v = R_v / B_v(T)$, wherein "$B_v(T)$" is the spectral radiance of a theoretical black body over the desired spectral range. Both the irradiating step a. and the determining step b., or the radiance-measuring step c., will be carried out using wavelengths throughout the full spectral range of interest. The relationship hereinabove designated "(1)" will be applied when steps a and b utilize the full range wavelengths, $p_v$ and $t_v$ representing the fractions of such radiation that are reflected and transmitted, respectively, and being measured in step b. The relationship designated "(2)" will be applied when step c. utilizes the full spectral range radiation, radiance of the sample over the desired spectral range, as well as at the selected wavelength, being measured therein.

In the preferred embodiments of the method, the "selected" wavelength of irradiating radiation, at which the measurements of steps b. and c. are made, will be in the mid-infrared region of the spectrum. Reflectance of one or more wavelengths of the irradiating radiation may be found in step b. to have a value of substantially zero, and transmittance of that same wavelength of radiation through the sample may also be found (or be known) to have a value of zero. In such a case, that wavelength will be deemed the "selected" wavelength; $e_o$ will have a value of unity, and the relationship employed in the correlating step d. will be $R_o = B_o(T)$. Most desirably, reflectance and transmittance will be determined by hemispherical directional measurements, and radiance measurements will be made at only one angle. Typical hot sample temperatures will be about 600° to 5,000° Rankine, and spectral emittance determinations will desirably be made over the wavelength range 0.4 to 50 micrometers.

Other objects of the invention are attained by the provision of apparatus for use in simultaneously determining the surface temperature "T" of a hot sample of material and its spectral emittance "$e_v$" over a desired spectral range. The apparatus comprises: supporting means, including structure for mounting a sample of material to be tested; means for heating the mounted sample to an elevated temperature; means, including a radiation source, for irradiating the surface on one side of the sample with electromagnetic radiation; means for collecting radiation that is reflected from the irradiated surface of the mounted sample, and for collecting radiation that is emitted therefrom, the collecting and irradiating means cooperatively permitting collection of the reflected radiation hemispherically (i.e., from all angles throughout a 180° arc on the irradiated side of the sample); means for measuring the amounts of radiation that is so reflected and emitted at each of a multiplicity of wavelengths throughout a spectral range of interest, to provide indicative data; and electronic data processing means for processing the indicative data to determine the temperature and spectral emittance of the hot sample. The data processing means of the apparatus is programmed to carry out the steps of:

a. determining the fraction "$a_o$" of a selected wavelength of irradiating radiation that is absorbed by the hot sample, by measuring the fraction "$p_o$" of the selected wavelength radiation that is reflected from it, to thereby determine the spectral emittance "$e_o$" of the sample at the selected wavelength, by application of the equations:

$$a_o = 1 - p_o;$$

and $$e_o = a_o;$$

b. measuring the radiance "R" of the hot sample at least at the selected wavelength, to obtain at least a value for radiance "$R_o$" at the selected wavelength;

c. correlating the measured value of the radiance $R_o$ to the spectral radiance "$B_o(T)$" of a theoretical black body at the selected wavelength, to determine T by application of the relationship:

$$R_o = e_o B_o(T);$$

and d. determining the spectral emittance "$e_v$" of the hot sample over the desired spectral range by application of one of the relationships:
 (1) $a_v = 1 - p_v$; and $e_v = a_v$; and
 (2) $e_v = R_v / B_v(T)$,
the relationships being applied as hereinabove set forth.

The apparatus thus described is suitable for use with samples of materials that are known to be opaque to radiation in the wavelength regions of interest. In other instances the irradiating and collecting means will be adapted to also collect radiation that is transmitted through the sample and that is emitted from the surface on the unirradiated side thereof, and the data processing means will be programmed additionally to measure and values of $t_o$ and $t_v$ and to apply the equations and relationships utilizing those values, as hereinabove set forth.

In certain preferred embodiments, the collecting and irradiating means of the apparatus will cooperatively permit collection of the reflected (and, where appropriate, transmitted) radiation simultaneously from all angles throughout a 180° arc. In other embodiments, the apparatus will desirably permit relative rotation of the sample and the radiation-directing optics, to permit measurements to be made at discrete angles for integration so as to provide the desired information. A Fourier-transform infrared spectrometer will, in any event, generally comprise the means for measuring and the electronic data processing means of the apparatus.

In those instances in which hemispherical radiation measurements are to be made simultaneously, the apparatus will most desirably include a hemi-ellipsoidal mirror having two foci, comprising a component of either the irradiating means or the collecting means, so as to permit collection of radiation on one or both sides of the sample. The support means will advantageously so support and position the mirror and the radiation source as to dispose the source at one focus of the mirror and the sample at the other. Such apparatus will usually also include chopping means associated with the radiation source, adapted to intermittently permit and block the passage of radiation from the source to the mirror. The chopping means will typically comprise a rotor, means for effecting its rotation, and means for cooling it. The rotor will have a first sector, for permitting the passage of radiation, normally taking the form of a semicircular slot about 180° in length, and a second sector for blocking such radiation, which will desirably comprise a semicircular blackbody band also about 180° in length.

BRIEF DESCRIPTION OF THE DRAWINGS

FIG. 3 is a schematic representation of a second form of bench-top system embodying the invention.

DETAILED DESCRIPTION OF THE ILLUSTRATED EMBODIMENTS

Figure 1:
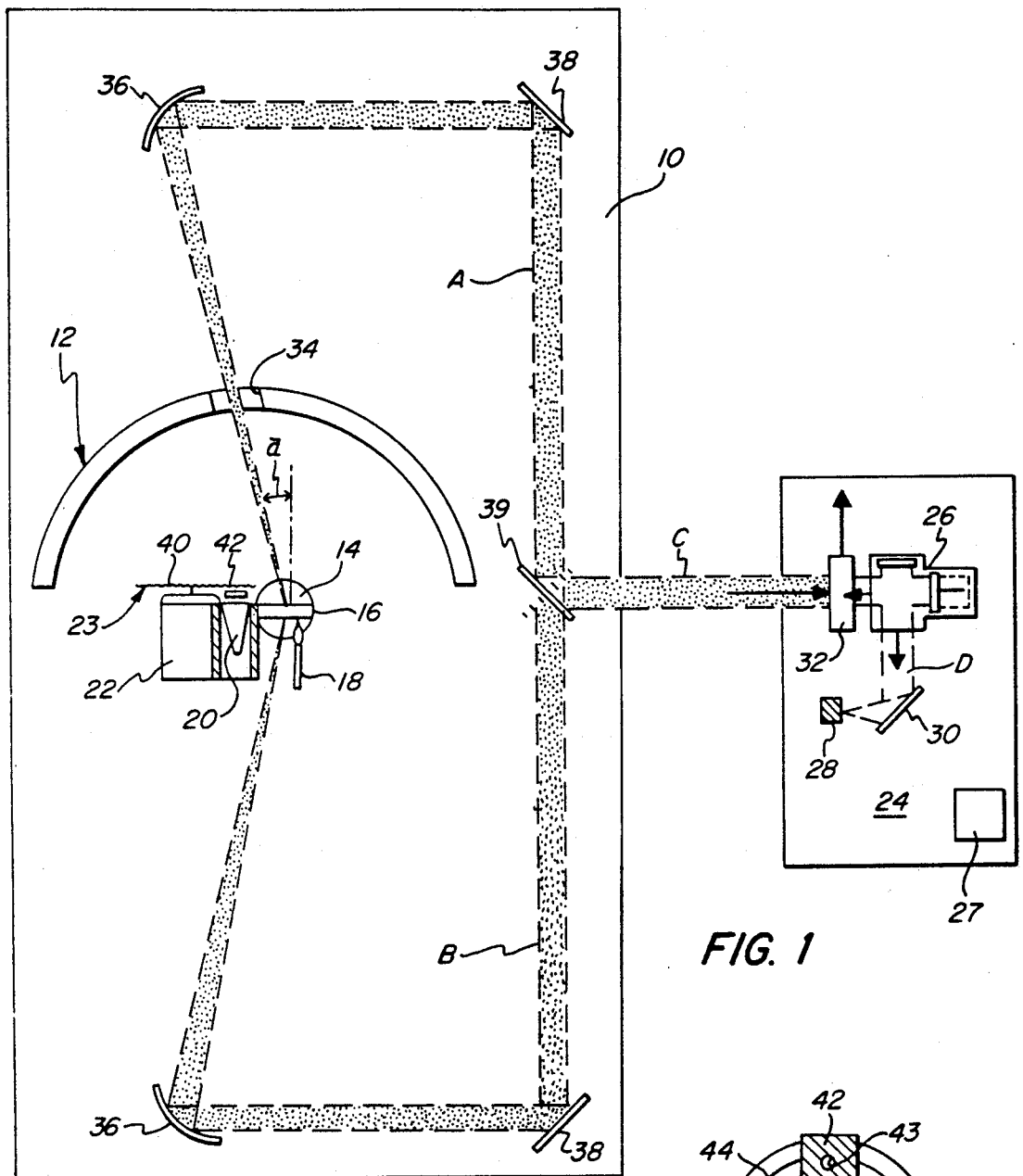
FIG. 1 is a schematic representation of a bench-top system embodying the present invention.
Figure 2:
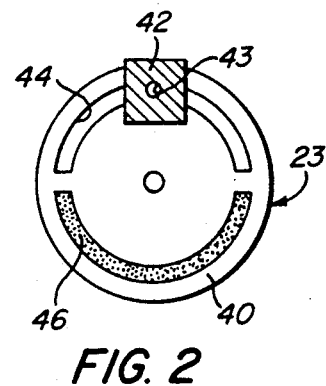

Turning now in detail to FIGS. 1 and 2 of the appended drawings, therein illustrated schematically is apparatus embodying the present invention, including an optical table 10 on which is supported a hemi-ellipsoidal mirror, generally designated by the numeral 12, and a mount 14 for the sample 16 to be tested. Hemi-ellipsoidal mirrors and the like are known in the art for use in measuring directional hemispherical reflectance (see, for example, B. E. Wood, J. G. Pipes, A. M. Smith and J. A. Roux, *Applied Optics*, 15, 940 (1976)).

A flame heater 18, such as an oxygen-acetylene torch, is disposed proximate the mount 14 for heating of the sample 16, and a blackbody cavity 20 radiation source is located alongside of it. The mount 14 and the mirror 12 are so positioned as to dispose the mounted sample 16 at one of the foci of the mirror; the cavity 20 is so located as to provide a source of infrared radiation at the other focus. Because of its particular properties, the hemi-ellipsoidal mirror 12 will cause the radiation from the cavity 20 to impinge upon the sample 14 at all angles simultaneously throughout a 180° arc; it will produce, in cooperation with the cavity 20, the effect of hemispherically surrounding the sample with an isotropic black body source.

A chopper, including a motor 22 and a rotor, generally designated by the numeral 23, is so positioned as to dispose the rotor disk 40 over the mouth of the cavity 20. The construction of the rotor disk 40 will be described in greater detail hereinbelow.

The apparatus also includes a Fourier-transform infrared spectrometer, generally designated by the numeral 24, including interferometer 26 and computer 27; a Bomen MB-151, modified to provide an extended spectral range of 0.8 to 20 micrometers, may be employed. A radiation detector 28 is associated with the FT-IR, and transfer and collection optics, including plane mirrors 30 and 38, paraboloidal mirrors 36, beam-directing mirror 32, and pivotable selector mirror 39, are provided.

Turning now in greater detail to FIG. 2, it will be noted that the chopper arrangement includes a fixed block 42, positioned adjacent the mouth of the blackbody cavity 20 and having an aperture 43. The rotor disk 40 has a semicircular slot 44 extending along a circumferential arc of approximately 180°, and it has a correspondingly dimensioned and configured semicircular band 46, which is fabricated to function as a nonreflecting blackbody surface. Although not illustrated, it will be appreciated by those skilled in the art that the apparatus will normally include means for cooling the disk 40 so as to maintain the blackbody band segment 46 at a low temperature. Rotation of the disk 40 will of course intermittently permit radiation from the cavity 20 to pass out of the aperture 43, and to block passage therethrough, causing the rotor, in combination with the fixed aperture 43, to act as a square wave switch between the two chopper states, with which the spectrometer will be synchronized through its computer 27.

Radiation from the cavity 20, focused by the mirror 12 upon the heated sample 16 and reflected from its forward surface, will pass, along with the radiation that is emitted from that surface, through the hole 34 in the mirror and be reflected by mirrors 36 and 38 along path A to the location of the selector mirror 39. Similarly, radiation reflected by the hemi-ellipsoidal mirror 12 and transmitted through the sample 16 will travel (together with radiation emitted from the non-irradiated surface of the sample) along path B to the selector mirror location. Depending upon the orientation of the mirror 39, one of the two beams A and B will be projected along path C into the interferometer 26 of the FT-IR spectrometer 24, from which it will proceed along path D to the mirror 30 and into the detector 28. During the phase of each cycle of revolution of the disk 40 in which the blackbody band 46 covers the aperture 43 of the block 42, it will be appreciated that the only radiation emanating from the sample 16 that will pass along paths A and B to the detector 28 is that which is emitted by its surfaces (low intensity radiation from bodies at room temperature will of course also pass to the detector). Using the spectra generated during both phases of the cycle of rotation of the disk 40, the computer 27 of the FT-IR can, by difference, readily determine values for emitted, reflected, and transmitted radiation.

It might be noted that it is advantageous that the radiation port 34 in the mirror 12 be centered at an angle (designated "a" in FIG. 1) of 15° from the sample surface normal, and that it subtends an angle of plus and minus 7° at the sample surface. Polarization effects are negligible at the 15° take-off angle, and an aperture of the indicated size avoids significant optical error. This construction also enables radiance measurements to be made at a single angle, thus affording operational benefits as compared to a multi-angle radiance determination; emissivity is not a rapidly varying function of angle for most substances.

It should also be noted that the mirror 32 of the spectrometer 24 is provided for the purpose of directing a portion of the beam exiting from the interferometer to a second detector (not illustrated). In an FT-IR system, the radiation to be detected will include wavelengths within both the near infrared and also the mid-infrared (e.g., 2 to 20 micrometers) regions of the spectrum, and therefore two detectors (e.g., an InGaAs detector and an MCT detector), specifically responsive to radiation in those wavelength ranges, will normally be employed.

As an initial step in the simultaneous determination of the temperature and wide-band spectral emittance of a heated sample, the radiation reflected from and (if necessary) transmitted through the sample are collected and measured, the illustrated apparatus enabling the total hemispherical-directional reflectance and transmittance over all angles to be simultaneously determined for that purpose. The reflectance and transmittance measurements are used to determine the sample emittance at a selected wavelength and an imprecisely known temperature, which emittance is then employed, in conjunction with the measured radiance value at the same wavelength, to determine the precise temperature. Knowing the temperature, emittance of the sample throughout the full spectral range of interest can be determined, using the measured broad spectrum radiance value.

Either of two techniques can be employed in the temperature-determining step. In the first, the equation $e_o = 1 - p_o - t_o$, in which the symbols have the definitions hereinabove set forth, is employed, and the wavelength at which the parameters are measured (i.e., the "selected wavelength") will be one at which greatest certainty would exist in regard to the measurements made. Of course, measurements at several selected wavelengths may be made and applied if so desired, and may afford even greater accuracy. Having thus determined a value for $e_o$, matching the quantity $R_o/e_o$ to the theoretical blackbody curve $B_o(T)$, wherein $R_o$ is the radiance of the sample at the selected wavelength, will yield an accurate temperature value. The spectral emittance of the sample over the complete spectral range of interest (which may, for example, include light in the visible as well as the IR regions) can then be determined by application of the equation $e_v = R_v/B_v(T)$, wherein $R_v$ is the measured radiance of the sample over the complete range of interest, and $B_v(T)$ is the blackbody curve over the same range at the determined temperature of the sample.

An alternative method for determining $e_o$ may be applied in those instances in which the sample is found to have a reflectance of zero or negligible value, at least at one wavelength. Such an occurrence is indicative of the so-called "Christiansen effect," in which strong absorption bands, observed at long wavelengths, cause many dielectric materials to exhibit blackbody behavior, and hence to have unity emittance value (provided they are also opaque to the impinging radiation). That being the case, the temperature of the hot sample can readily be determined by matching the measured value of $R_o$ to theoretical blackbody radiation curves. It will be appreciated that the one-step collection of hemispherical directional reflectivity data, in accordance with the invention, will serve to identify the presence of the Christiansen effect phenomenon, and/or to provide the data necessary to apply the emittance-determining algorithm.

Because of limitations inherent in current mirror technology, it will also be appreciated that, in the present state of the art, temperature determinations using an optical table of the kind hereinabove described will most effectively be carried out utilizing radiation in the infrared region. Once having obtained a precise temperature value, however, the procedure of the invention permits broad spectral emittances to be determined.

Among the benefits provided by the apparatus illustrated in FIGS. 1 and 2 are included the avoidance, by virtue of its general geometry, of reflected furnace radiation, thus obviating problems associated with distinguishing such reflected radiation from that which is emitted from the sample, and doing so without sacrifice of precise knowledge of sample temperatures. It also avoids the need for taking radiation measurements from a sample surrounded by a furnace, which is of course cumbersome and time-consuming. The capability that the hemi-ellipsoidal mirror affords, of concurrently collecting total hemispherical directional reflectance and transmittance, eliminates any need to individually measure and integrate values of radiation reflected or transmitted at multiple discrete angles, and it avoids any need to effect relative rotation between the sample and the collection or irradiation means or optics; it also makes it unnecessary to rotate a non-isotropic sample, so as to compensate for its nonuniform properties. It might be pointed out that an alternative arrangement to that which is shown in FIG. 1 can be employed, in which the detector, rather than the radiation source, is disposed at one of the foci of the hemi-ellipsoidal mirror; thus, irradiation can be effected at all angles, with collection being effected from only one, or vice versa.

It will be appreciated that the apparatus of the invention need not necessarily employ a hemi-ellipsoidal mirror, or equivalent optical component, and that in some instances the apparatus would advantageously be adapted to enable such relative rotation, to thereby permit the extraction of information that is of an angularly dependent nature. In this regard, detailed reference is now made to FIG. 3 of the drawings, wherein the apparatus schematically illustrated is adapted for individually measuring values of radiation reflected or transmitted at multiple discrete angles, and for integrating those values.

Figure 3:
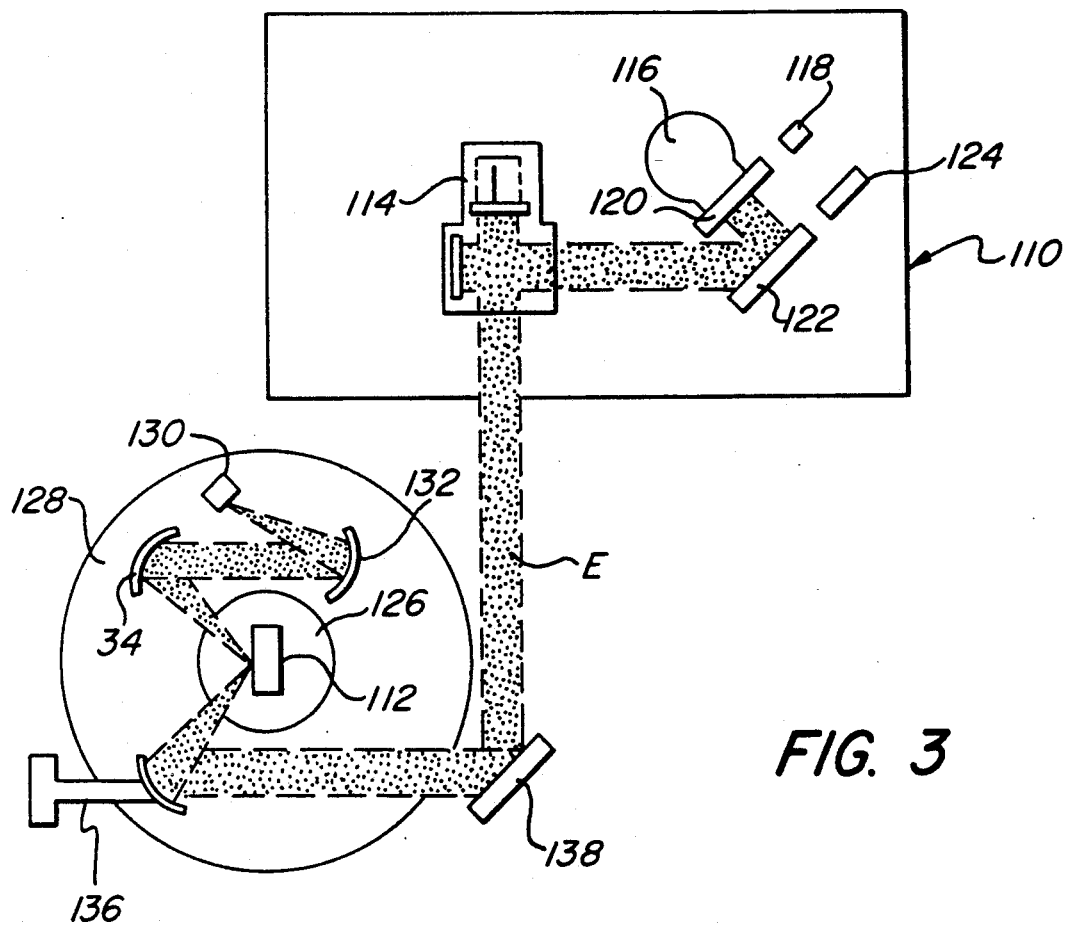
FIG. 3 is a schematic representation showing the chopper rotor subassembly utilized in the apparatus of FIG. 1, drawn to a greatly enlarged scale.

The apparatus of FIG. 3 is comprised of a Fourier-transform infrared spectrometer, generally designated by the numeral 110, augmented with means for establishing appropriate optical paths to and from the sample 112. The FT-IR 110 includes an interferometer 114, an infrared radiation source 116, an emission detector 118, a movable mirror 120, and two fixed mirrors 122 and 124. The sample 112 is situated upon a stage 126, about which is rotatably disposed an annular platform 128, the latter carrying a radiation detector 130 and two mirrors 132 and 134; mounted externally of the platform and stage are two additional mirrors, 136 and 138, and means (not illustrated) will of course be provided for heating the sample so disposed.

In the optical path configuration shown in FIG. 3, established by the mirrors 132, 134, 136 and 138 and as indicated by the shaded beam E, the apparatus is arranged to measure that portion of the spectral radiation, emanating from the FT-IR, which is reflected from the surface of the sample 112 to the detector 130. In the mode of operation illustrated, the movable mirror 120 of the FT-IR is operatively displaced so as to permit the beam to be projected from source 116 onto the mirror 122. Needless to say, rotation of the platform 128 about the sample 112 will permit radiation at each of a multiplicity of discrete angles to be measured, for integration by the computer of the FT-IR 110; operatively positioning the detector 130 behind the sample will of course permit transmittance measurements to be made, also at multiple, discrete angles.

As an alternative configuration (not shown), when emission from the sample 112 is measured the movable mirror 120 is operatively positioned in front of the source 116, so as to block radiation therefrom. The radiation emitted from the sample 112 travels sequentially along a path to the mirrors 136 and 138 and through the interferometer 114, then to be reflected by the mirror 122, 120 and 124 to the emission detector 118.

It will be appreciated by those skilled in the art that in this embodiment concurrent reflectance and emission measurements will be made by suitable manipulation of the mirror 120; a half-mirrored, half-transparent plate, or other form of diverter, may be substituted at that location if so desired. It will also be appreciated that the positioning of the sample 112 may be varied from that shown, to achieve an optimal orientation for making the necessary measurements.

Heating of the sample may be accomplished by any suitable means, including for example laser beam and high frequency induction heating as alternatives to the flame-heating technique described. The sample mount must of course be capable of withstanding elevated temperatures, and its construction should be such as to prevent its own radiation from being directed into the emission collection optics. Indeed, as a more general matter it will be appreciated by those skilled in the art that the method and apparatus of the invention must be so carried out and constructed, respectively, as to ensure that radiation emanating from the sample mount and the heating means does not affect the measurement of radiation emanating from the sample. This may be achieved in either of two ways: (1) so constructing the apparatus that its geometry prevents such extraneous radiation from reaching the collection optics directly, or indirectly by transmission through or reflection from the sample; or (2) by utilizing heating means (such as an oxygen-acetylene flame) that produces radiation limited to one or more known, narrow bands, which bands are avoided (or can be ignored because of weakness) in making measurements.

Integration of FT-IR spectrometry into the method and apparatus is highly advantageous, for all of the well-known speed, automation, convenience, and other benefits that are inherently afforded thereby.

Thus, it can be seen that the present invention provides a novel method and apparatus by which the temperature of a hot sample, and its spectral emittance over a desired spectral range at that temperature, can be determined effectively, conveniently, automatically and simultaneously, at high speed and with a high degree of precision.

Having thus described the invention, what is claimed is:

1. In a method for determining the surface temperature "T" of a hot sample, and the spectral emittance "$e_\nu$" thereof at said temperature T and over a desired spectral range, the steps comprising:
  (a) heating a sample to a temperature of about 600° to 5000° Rankine by means that produces radiation limited to known, narrow bands;
  (b) irradiating said heated sample with electromagnetic radiation at least a fraction of said radiation being absorbed by said sample;
  (c) measuring the fraction "$p_o$" of a selected wavelength of said irradiating radiation that is reflected from said sample, and measuring the fraction "$t_o$" of said selected wavelength of said irradiating radiation that is transmitted through said sample, unless transmission therethrough is known to be zero, and using the values so measured to determined the fraction "$a_o$" of said selected said irradiating radiation that is absorbed by said sample, by application of the equation:

$$a_o = 1 - p_o - t_o,$$

and to thereby determine the spectral emittance "$e_o$" of said sample at said selected wavelength, by the equation:

$$e_o = a_o;$$

(d) measuring the radiance "R" of said heated sample at least at said selected wavelength, to obtain at least a value for radiance "$R_o$" at said selected said measurements made in said steps (c) and (d) being substantially exclusive of radiation in said narrow bands, and at least one of the combination of said two steps (b) and (c), and said step (d), being carried out using wavelengths throughout a desired spectral range;

(e) matching the quantity $R_o/e_o$ to the spectral radiance "$B_o(T)$" of a theoretical black body at said wavelength, to determine T in accordance with the relationship:

$$R_o/e_o = B_o(T);$$

and (f) determining the spectral emittance $e_v$ of said heated sample over said desired spectral range by application of one of the relationships:
(1) $a_v = 1 - p_v - t_v$; and $e_v a_v$; and
(2) $e_v = R_v/B_v(T)$,
said relationship (1) being rendered applicable by said irradiating step (b) hereof using electromagnetic radiation of wavelengths throughout said desired spectral range, and by measuring, in said step (c) hereof, the fraction $p_v$ of said desired spectral range radiation that is reflected from said sample and, unless known to have a value of zero, the fraction $t_v$ of said desired spectral range radiation that is transmitted through said sample, to thereby determine the fraction $a_v$ of said desired spectral range radiation that is absorbed by said sample, in addition to measuring in said step (c) said fraction $p_o$ and, if necessary, said fraction $t_o$; said relationship (2) being rendered applicable by measuring, in said measuring step (d) hereof, radiance "$R_v$" of said sample over said desired range as well as at said selected wavelength, "$B_v(T)$" being the spectral radiance of a theoretical black body at temperature T over said desired spectral range.

2. The method of claim 1 wherein, in said step (c), hemispherical directional reflectance and, unless known to be zero, hemispherical directional transmittance are measured, and wherein, in said step (d), radiance is measured at only one angle.

3. The method of claim 1 wherein said means by which said sample is heated comprises an oxygen-acetylene flame source.

4. In a method for determining the surface temperature "T" of a hot sample, and the spectral emittance "$e_v$" thereof at said temperature T and over a desired spectral range, the steps comprising:

(a) irradiating with electromagnetic radiation a hot sample having a temperature substantially above ambient, at least a fraction of said radiation being absorbed by said sample;

(b) measuring, by hemispherical directional reflectance, the fraction "$p_0$" of a selected wavelength of said irradiating radiation that is reflected from said sample, and measuring, by hemispherical directional transmittance, the fraction "$t_0$" of said selected wavelength of said irradiating radiation that is transmitted through said sample, unless transmission therethrough is known to be zero, and using the values so measured to determine the fraction "$a_0$" of said selected wavelength of said irradiating radiation that is absorbed by said sample, by application of the equation:

$$a_0 = 1 - p_0 - t_0,$$

and to thereby determine the spectral emittance "$e_0$" of said sample at said selected wavelength, by the equation:

$$e_0 = a_0;$$

(c) measuring, at only one angle, the radiance "R" of said hot sample at least at said selected wavelength, to obtain at least a value for radiance "$R_0$" at said selected wavelength; at least one of the combination of said two steps (a) and (b), and said step (c), being carried out using wavelengths throughout a desired spectral range;

(d) matching the quantity $R_0/e_0$ to the spectral radiance "$B_0(T)$" of a theoretical black body at said selected wavelength, to determine T in accordance with the relationship:

$$R_0/e_0 = B_0(T);$$

and (e) determining the spectral emittance $e_v$ of said hot sample over said desired spectral range by application of one of the relationships:
(1) $a_v = 1 - p_v - t_v$; and $e_v = a_v$; and
(2) $e_v = R_v B_v(T)$,
said relationship (1) being rendered applicable by effecting said irradiating step (a) hereof using electromagnetic radiation of wavelengths throughout said desired spectral range, and by measuring, in said step (b) hereof, the fraction $p_v$ of said desired spectral range radiation that is reflected from said sample and, unless known to have a value of zero, the fraction $t_v$ of said desired spectral range radiation that is transmitted through said sample, to thereby determine the fraction $a_v$ of said desired spectral range radiation that is absorbed by said sample, in addition to measuring in said step (b) said fraction $p_0$ and, if necessary, said fraction $t_0$; said relationship (2) being rendered applicable by measuring, in said measuring step (c) hereof, radiance "$R_v$" of said sample over said desired spectral range as well as at said selected wavelength, "$B_v(T)$" being the spectral radiance of a theoretical black body at temperature T over said desired spectral range.

5. The method of claim 1 wherein reflectance from said sample of at least one wavelength of said irradiating radiation is found in said step (b) to have a value of substantially zero, and wherein transmittance of said one wavelength there-through also has a value of substantially zero, said one wavelength being deemed said selected wavelength, so that $e_0$ has a value of unity and said relationship of said matching step (d) is $R_0 = B_0(T)$.

6. The method of claim 4 wherein said selected wavelength of electromagnetic radiation is in the mid-infrared region of the spectrum.

7. The method of claim 4 wherein said desired spectral range is 0.4 to 50 micrometers.

8. The method of claim 4 wherein said sample is heated to a temperature of about 600° to 5000° Rankine.

9. The method of claim 8 wherein said sample is heated by means that produces radiation limited to known, narrow bands, and wherein measurements made in said steps (b) and (c) are substantially exclusive of radiation in said narrow bands.

10. Apparatus for use in determining the surface temperature "T" of a heated sample of material, and the spectral emittance "$e_\nu$" of the sample at said temperature and over a desired spectral range, comprising:

supporting means including structure for mounting a sample of material having surfaces on opposite sides thereof;

means for heating to an elevated temperature the sample mounted by said structure of said supporting means;

means for irradiating with electromagnetic radiation the surface on one side of a sample so mounted, said means for irradiating including a radiation source;

means for collecting radiation, originating at said source, that is reflected from the irradiated surface of the mounted sample and that is transmitted therefrom through the sample, and the collecting radiation that is emitted from the surfaces on both sides of the sample, said means for irradiating and said means for collecting cooperatively permitting collection of said reflected and transmitted radiation from all angles throughout 180° arcs on opposite sides of the sample;

means for measuring the mounts of radiation that is so reflected, transmitted and emitted at each of a multiplicity of wavelengths throughout a spectral range, inclusive of the desired spectral range, to provide indicative data; and electronic data processing means for processing said data to simultaneously determine the temperature and spectral emittance of the heated sample, said data processing means being programmed to carry out the steps of:

(a) determining the fraction "$a_0$" of a selected wavelength of irradiating radiation that is absorbed by the heated sample, by application of the equation:

$a_0 = 1 - p_0 - t_0$, in which $p_0$ and $t_0$ are, respectively, measured values of radiation of said selected wavelength that is reflected by and transmitted through said sample, and thereby determining the spectral emittance "$e_0$" of the sample at said selected wavelength, by the equation:

$e_0 = a_0$;

(b) determining a value for radiance "$R_o$" of the heated sample at said selected wavelength;

(c) matching the quantity $R_o/e_o$ to the spectral radiance "$B_o(T)$" of a theoretical black body at said selected wavelength, to determine T in accordance with the relationship:

$R_o/e_o = B_o(T)$;

and (d) determining the spectral emittance "$e_\nu$" of the heated sample over the desired spectral range by application of one of the relationships:

(1) $a_\nu = 1 - p_\nu - t_\nu$; and $e_\nu = a_\nu$; and (2) $e_\nu = R_\nu/B_\nu(T)$, p2 $a_\nu$, $p_\nu$, and $t_\nu$ being measured values of radiation of said desired spectral range that is, respectively, absorbed, reflected and transmitted by the heated sample, $R_\nu$ being a measured radiance value for the heated sample over said desired spectral range, and "$B_\nu(T)$" being the radiance of a theoretical black body at temperature T over said desired spectral range.

11. The apparatus of claim 10 wherein said means for irradiating produces electromagnetic radiation in the infrared region of the spectrum.

12. The apparatus of claim 10 wherein one of sid means for irradiating and said means for collecting comprises a hemi-ellipsoidal mirror having two foci, said support means supporting and positioning said mirror so as to dispose the so-mounted sample at one focus thereof, said hemi-ellipsoidal mirror enabling collection of hemispherical-directional radiation simultaneously throughout each of said arcs.

13. The apparatus co claim 12 wherein said hemi-ellipsoidal mirror comprises said irradiating means, and wherein said radiation source is disposed at the other focus thereof.

14. The apparatus of claim 13 wherein said hemi-ellipsoidal mirror has an aperture therethrough from which radiation reflected by and emitted from the irradiated surface of the mounted sample passes to said means for collecting.

15. The apparatus of claim 12 additionally including chopping means associated with said radiation source, said chopping means being operable to intermittently permit and block the passage of radiation emanating from said source, to said mirror.

16. The apparatus of claim 15 wherein said chopping means comprises a rotor and means for effecting rotation thereof, said rotor having a first sector for permitting the passage of radiation therethrough, and a second sector for blocking such radiation passage.

17. The apparatus of claim 16 wherein said first sector comprises a semicircular slot about 180° in length, and wherein said second sector comprises a semicircular blackbody band about 180° in length.

18. The apparatus of claim 10 wherein said supporting means, and said means for irradiating and said means for collecting, are rotatable relative to one another so as to permit such collection throughout 180° arcs.

19. The apparatus of claim 10 including a Fourier-transform infrared spectrometer, said spectrometer comprising said means for measuring and said electronic data processing means.

20. Apparatus for use in determining the surface temperature "T" of a heated sample of material, and the spectral emittance "$e_\gamma$" of the sample at said temperature and over a desired spectral range, the sample being opaque to radiation throughout that range, comprising:

supporting means including structure for mounting a sample of material having surfaces on opposite sides thereof;

means for heating to an elevated temperature the sample mounted by said structure of said supporting means;

means for irradiating with electromagnetic radiation the surface on one side of a sample so mounted, said means for irradiating including a radiation source;

means for collecting radiation, originating at said source, that is reflected from the irradiated surface of the mounted sample, and for collecting radiation that is emitted from the sample, said means for irradiating and said means for collecting cooperatively permitting collection of said reflected radiation simultaneously from all angles throughout a 180° arc on the one side of the sample;

means for measuring the amounts of radiation that is so reflected and emitted at each of a multiplicity of wavelengths throughout a spectral range, inclusive of the desired spectral range, to provide indicative data; and electronic data processing means for processing said data to simultaneously determine the temperature and spectral emittance of the heated sample, said data processing means being programmed to carry out the steps of:

(a) determining the fraction "$a_o$" of a selected wavelength of irradiating radiation that is absorbed by the heated sample, by application of the equation:

$$a_o = 1 - p_o,$$

in which $p_o$ is a measured value of radiation of said selected wavelength that is reflected by said sample, and thereby determining the spectral emittance "$e_o$" of the sample at said selected wavelength, by the equation:

$$e_o = a_o;$$

(b) determining a value for radiance "$R_o$" of the heated sample at said selected wavelength;

(c) matching the quantity $R_o/e_o$ to the spectral radiance "$B_o(T)$" of a theoretical black body at said selected wavelength, to determine T in accordance with the relationship:

$$R_o/e_o = B_o(T);$$

and and (d) determining the spectral emittance "$e_\gamma$" of the heated sample over the desired spectral range by application of one of the relationships:

(1) $a_\gamma = 1 - p_\gamma$; and $e_\gamma = a_\gamma$; and (2) $e_\gamma = R_\gamma/B_\gamma(T)$, $a_\gamma$ and $p_\gamma$ being measured values of radiation of said desired spectral range that is, respectively, absorbed and reflected by the heated sample, $R_\gamma$ being a measured radiance value for the heated sample over said desired spectral range, and "$B_\gamma(T)$" being the spectral radiance of a theoretical black body temperature T over said desired spectral range.

21. The apparatus of claim 20 wherein said means for irradiating produces electromagnetic radiation in the infrared region of the spectrum.

22. The apparatus of claim 21 wherein said irradiating means comprises a hemi-ellipsoidal mirror having two foci, said support means supporting and positioning said mirror and said radiation source so as to dispose said source at one focus of said mirror and the so-mounted sample at the other focus thereof, said hemi-ellipsoidal mirror enabling collection of hemispherical directional reflected radiation simultaneously throughout said arc, and having an aperture therethrough from which radiation reflected by and emitted from the irradiated surface of the mounted sample passes to said means for collecting.

23. The apparatus of claim 22 additionally including chopping means associated with said radiation source, said chopping means being operable to intermittently permit and block the passage of radiation, emanating from said source, to said mirror, and comprising a rotor and means for effecting rotation thereof, said rotor having a semicircular slot, about 180° in length, for permitting the passage of radiation therethrough, and having a semicircular blackbody band, about 180° in length, for blocking such radiation passage.

24. The apparatus of claim 20 wherein said supporting means, and said means for irradiating and said means for collecting, are rotatable relative to one another so as to permit such collection throughout a 180° arc.

25. The apparatus of claim 20 including a Fourier-transform infrared spectrometer, said spectrometer comprising said means for measuring and said electronic data processing means.

* * * * *

UNITED STATES PATENT AND TRADEMARK OFFICE
CERTIFICATE OF CORRECTION

PATENT NO. : 5,239,488

DATED : August 24, 1993

INVENTOR(S) : James R. Markham et al

It is certified that error appears in the above-identified patent and that said Letters Patent is hereby corrected as shown below:

Claim 1, column 9, line 20, insert after "selected" the word --wavelength--; line 29, insert before "wavelength" the word --selected--; line 38, delete $e_v a_v$" and substitute therefor --$e_v = a_v$--; line 41, insert before "said" the word --effecting--; line 55, insert before "range" the word --spectral--.

Claim 10, column 11, line 37, delete "the" (second occurrence) and substitute therefor --for--.

Claim 12, column 12, line 28, delete "sid" and substitute therefor --said--.

Claim 13, column 12, line 36, delete "co" and substitute' therefor --of--.

Claim 20, column 14, line 5, delete "and".

Signed and Sealed this

Twenty-sixth Day of April, 1994

BRUCE LEHMAN

Attest:

Attesting Officer

Commissioner of Patents and Trademarks